Feb. 17, 1948.  A. A. POMMER  2,436,327
HYDRAULIC BRAKE PIPE COUPLING
Filed March 26, 1945  3 Sheets-Sheet 1
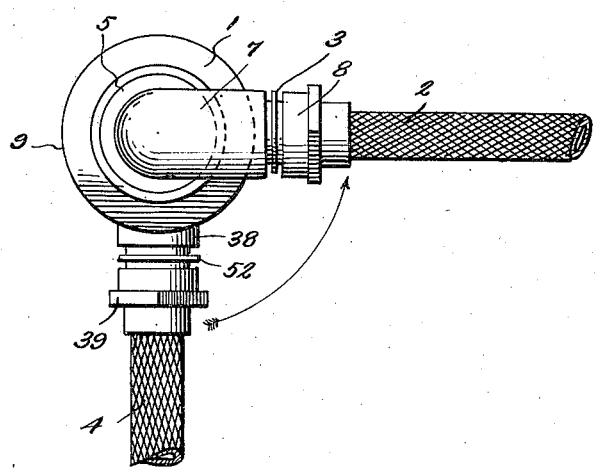
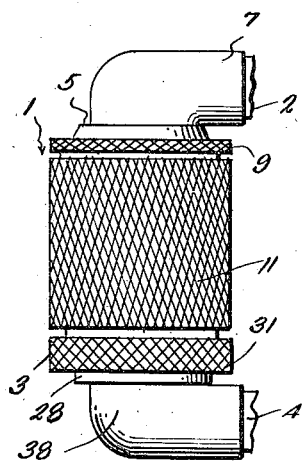
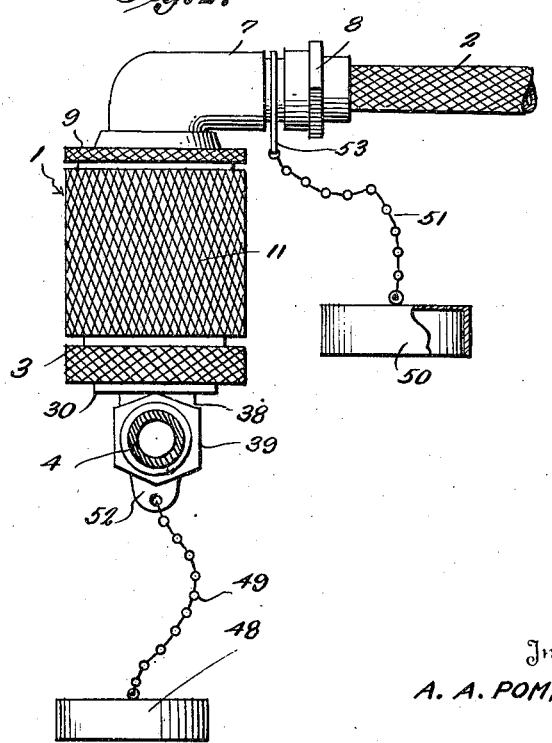
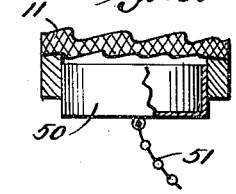
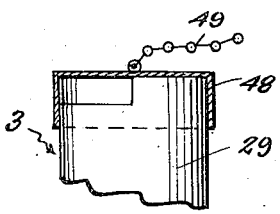
Inventor
A. A. POMMER Feb. 17, 1948.                A. A. POMMER                2,436,327
                    HYDRAULIC BRAKE PIPE COUPLING
            Filed March 26, 1945          3 Sheets-Sheet 2

Inventor
A. A. POMMER
By
Attorney

Feb. 17, 1948.  A. A. POMMER  2,436,327
HYDRAULIC BRAKE PIPE COUPLING
Filed March 26, 1945  3 Sheets-Sheet 3
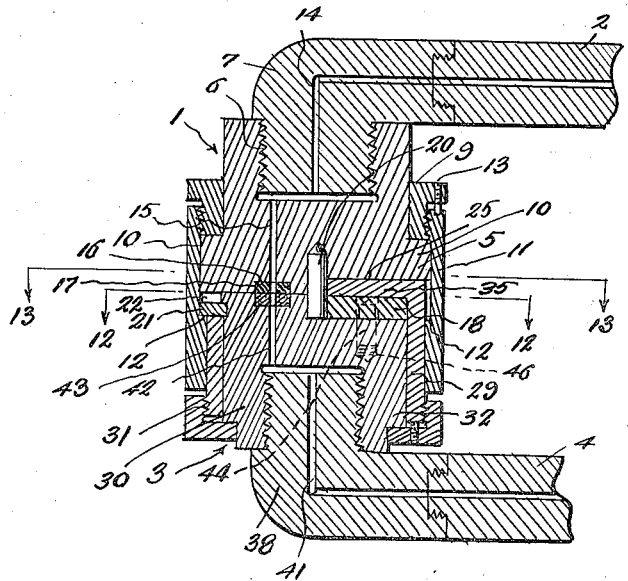
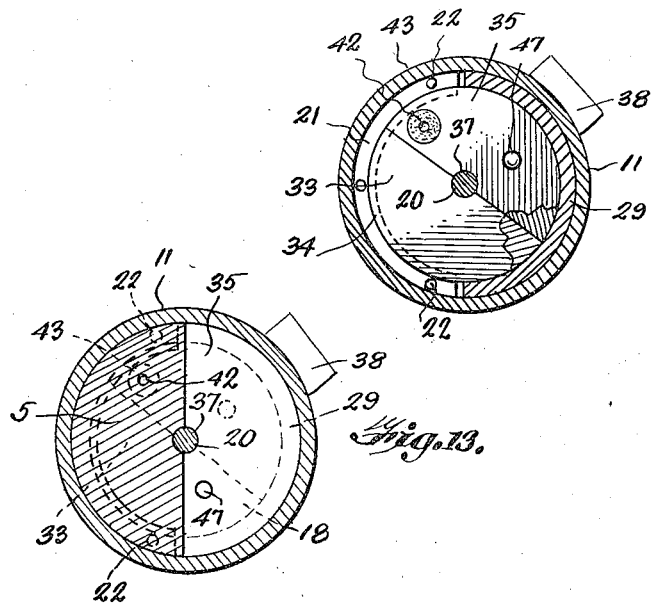
Inventor
A. A. POMMER Patented Feb. 17, 1948

2,436,327

UNITED STATES PATENT OFFICE 2,436,327

HYDRAULIC BRAKE PIPE COUPLING

Arthur A. Pommer, Montrose, Calif.

Application March 26, 1945, Serial No. 584,814

3 Claims. (Cl. 284—18)

This invention relates to a pipe coupling and more particularly to a coupling intended for use as means for releasably connecting pipes of a hydraulic brake system or the like, wherein liquid or other fluid is under very high pressure and it is desired to securely connect companion pipes without likelihood of leakage.

Therefore, one object of the invention is to provide a coupling comprising companion coupling sections which are held firmly in engagement with each other when coupled and members carried by the two sections moved into position for locking the sections together and also uncovering ports so that the ports may be disposed in registry with each other for passage of fluid through the coupling.

Another object of the invention is to provide one coupling section with a rotatable member which is held stationary when the coupling sections are separated by a latch which is automatically moved to releasing position allowing turning of the rotatable member when the coupling members are applied to each other.

Another object of the invention is to provide a coupling consisting of companion coupler members which may be readily and quickly applied to each other or detached, but will not be liable to accidentally becoming detached.

Another object of the invention is to provide a coupler which will very effectively prevent leakage of liquid and also prevent air from entering and interfering with proper operation of the hydraulic brakes of a brake system.

Another object of the invention is to provide a coupler consisting of companion members so formed that when they are detached from each other, loss of liquid in a hydraulic brake system will be prevented.

Another object is to provide a coupler consisting of sections so formed that when they are detached from each other, shields may be applied to prevent dust and other dirt or foreign matter from entering the coupling members and causing them to become clogged.

Another object of the invention is to provide a coupler which is simple in construction, cheap to manufacture, and very easy to assemble or take apart for cleaning or repairs.

In the accompanying drawings:

Fig. 1 is a top plan view of the improved coupler.

Fig. 2 is a side view of the coupler shown in Fig. 1.

Fig. 3 is a view similar to Fig. 2, showing the coupler members locked together.

Fig. 11 is a view similar to Fig. 8, showing the coupler sections locked to each other.

Fig. 12 is a sectional view on the line 12—12 of Fig. 11.

Fig. 13 is a sectional view on the line 13—13 of Fig. 11.

Fig. 14 is a view showing the dust-excluding plug applied to the female coupler member.

Fig. 15 is a view showing the dust-excluding cap applied to the male coupler member.

The improved coupling constituting the subject matter of this invention consists of a female coupler member 1 carried by a pipe 2 and a male coupler member 3 carried by a pipe 4 and, when the coupler members are applied to and locked in engagement with each other, flow of liquid under pressure will be permitted from one pipe to the other.

Figure 4:
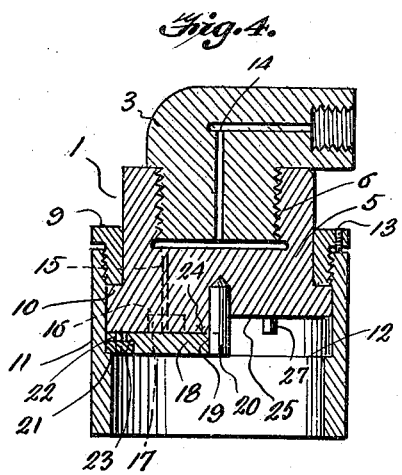
Fig. 4 is a sectional view taken longitudinally through the female coupler member, the view being on the line 4—4 of Fig. 1.
Figure 7:
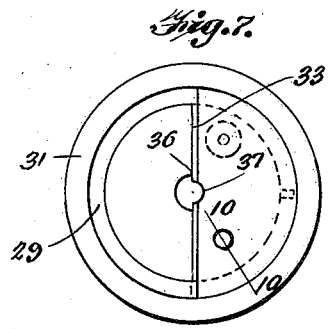
Fig. 7 is a top view of Fig. 6.
Figure 5:
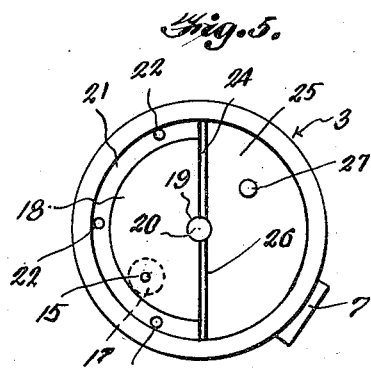
Fig. 5 is a view looking at the lower end of Fig. 4
Figure 8:
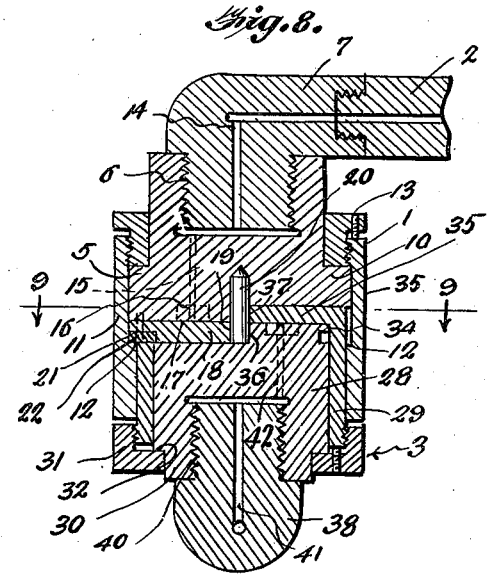
Fig. 8 is a sectional view taken longitudinally through the coupler and coupler members when first applied together.
Figure 6:
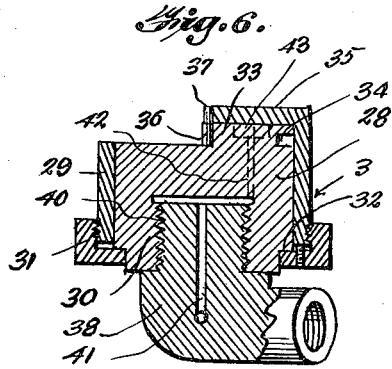
Fig. 6 is a sectional view taken longitudinally through the male coupler member.
Figure 9:
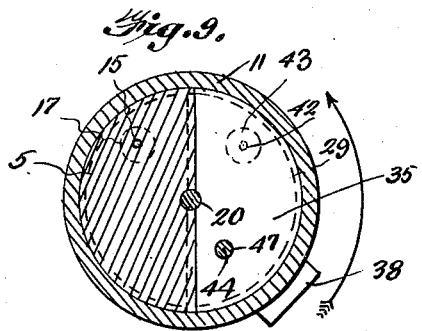
Fig. 9 is a transverse sectional view on the line 9—9 of Fig. 8.

The female coupler member has a body or head 5 which is circular in cross section or end elevation and formed with a threaded socket 6 which opens through its outer end and receives an elbow 7 to which pipe 2 is connected by a terminal 8 of conventional formation. An externally threaded ring or collar 9 is rotatably mounted about the body 5 with its inner end abutting an outstanding annular flange or shoulder 10 surrounding the inner end of the body and this ring is screwed into a sleeve 11 which projects forwardly beyond the body and is formed with an internal annular shoulder 12. After the sleeve 11 has been screwed to its proper position upon the ring 9 a set screw 13 is tightened and holds the sleeve and the ring against turning movement relative to each other. When the elbow 7 is screwed into the socket 6, its end terminates in spaced relation to the inner end of the socket so that communication will be established between the passage 14 of the elbow and the bore or passage 15 formed through the body 5. The bore 15 is enlarged at its outer end to form a seat 16 in which a gasket 17 is mounted to form a tight seal when a plate 18 is in position to extend across the gasket and block the outer end of bore 15. This plate 18 is of semicircular shape, as shown in Fig. 5, and is formed with a recess 19 in order that the plate may fit about a pin 20 and be turned about the pin from the retracted position shown in Fig. 5 to the extended position shown in Fig. 13. An arcuate retainer 21 which is anchored to the body 5 by pins 22 overlaps a flange 23 extending along the arcuate edge of the plate 18 to hold the plate in place and guide movement thereof about the pin 20. The strip 21 serves to hold the plate 18 tightly against the flat face of the body 5 and cause a tight seal to be formed and prevent escape of liquid from bore 15 when the plate is in its retracted position. Referring to Fig. 4, it will be seen that the inner or front end of the body 5 has a flat semicircular face 24 against which the plate 18 fits and a second flat semicircular face 25 which is disposed in offset parallel relation to the face 24. These offset surfaces define a shoulder 26 extending in slightly offset relation to a diameter of the body and, by referring to Fig. 5, it will be seen that the pin 20 is located midway the length of the shoulder and that when the plate 18 is in retracted position its straight edge extends diametrically of the body in spaced parallel relation to the shoulder 26. A pin 27 projects from the surface 25 of the body 5 and this pin is located diametrically opposite the bore or port 15, as shown in Fig. 5.

Figure 10:
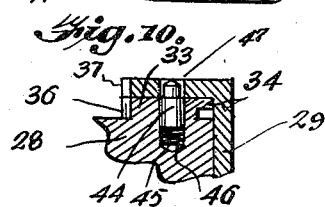
Fig. 10 is a fragmentary sectional view on the line 10—10 of Fig. 7.

The male member 3 has a body 28 circular in cross section and fitting within a cylindrical sleeve 29, and has a reduced rear end portion 30 about which fits a nut or collar 31 which bears against the annular shoulder 32 and has threaded engagement with the externally threaded end portion of the sleeve 29 to rotatably hold the body 28 and the sleeve 29 in engagement with each other. For half of its circumference, the body 28 is extended to form an integral extension 33 having the arcuate portion of its margin formed with an outstanding flange 34 for overlapping engagement with the arcuate strip 21 when the body 28 is given a partial turn in sleeve 29 and moved from a retracted position in which it is disposed entirely under the semicircular flange or end wall 35 of the sleeve 29 to an extended position in which it extends transversely of the wall 35 and projects across the face 24 of the body 5. The straight edge face of the extension 33, which extends diametrically of the body 28, is formed midway its length with a socket 36 and the wall or flange 35 is formed with a similar recess 37 so that the pin 20 may engage in the registering recesses and form a pivot about which the extension 33 of the body 28 will turn from a retracted position to an extended position and move plate 18 with it about the pin 20. An elbow 38 with which the pipe 4 is connected by a terminal 39 is screwed into a threaded socket 40 formed centrally of the body 28 and since the end of the elbow is spaced from the inner end or bottom of the socket, communication is established between the bore 41 of the elbow and the passage 42 formed through the body 28 and its extension 33. This passage 42 has an enlarged end portion forming a seat to receive a gasket 43 which forms a tight seal for the passage 42 when the extension 33 is in its retracted position under flange 35 and will also have flat face to face contact with the gasket 17 and establish fluid-tight communication between the passages 15 and 42, as shown in Fig. 11, when the extension 33 and the plate 18 are extended. Communication will thus be established between the pipes 2 and 4 and, since one pipe leads from a source of fluid under high pressure and the other pipe leads to fluid brakes, the brakes will be rendered operative when the couplings 1 and 3 are connected. It should also be noted that portions of the extension 36 and plate 18 will be disposed under the flange or wall 35 when moved to an extended position and both the extension and the plate will have their flanges 23 and 24 engaged under the arcuate strip 21 and the two coupling members 1 and 3 will be firmly held together and prevented from accidentally slipping apart since they must be turned to retract the extension 33 and the plate 18 before they may be detached from each other. When the extension 33 is in its retracted position, it is held against movement by a latching pin 44 which is slidably received in a socket 45 formed in the extension and urged outwardly to its operative position, shown in Fig. 10, by a spring 46. The outer end of the latching pin 44 engages in an opening or seat 47 formed through the flange 35 and prevents turning of the body 28 until the two coupler sections are applied to each other and the pin 27 enters the opening 47 and presses against the end of pin 44 to depress it and move it out of the opening 47 so that the body 28 may be turned in the sleeve 29. Since the latching pin returns to an operative position in the opening 47 when the coupler members are separated, the extension 33 will be held under the flange and, since the plate is frictionally held against accidental turning by frictional engagement with the strip 22, it will be prevented from accidentally turning out of the retracted position. Therefore, fluid cannot escape when the coupler sections are separated.

To prevent dust or dirt from collecting under the outer end of the coupler member 3, there has been provided a cap 48 which fits about the sleeve 29 and is held against loss by a chain. There has also been provided a plug 50 carried by a chain 51 and which is thrust into the sleeve 11 when in use and prevents dust and dirt from entering said sleeve. Since the chains 49 and 51 are provided with mounting plates 52 and 53 engaged about the terminals 39 and 8, the cap and plug will not become lost.

What is claimed is:

1. A coupling for pipes comprising companion male and female coupler members circular in cross section and rotatable relative to each other, each coupler member having a casing and a body therein formed with a fluid passage for registering with the fluid passage of the other coupler member when the male coupler member is fitted into the female coupler member and its body turned out of its normal position, said male coupler member having its casing provided with a semicircular closure covering the passage of its body when its body is in its normal position, and a closure in the female coupler member normally closing the passage in its body and engaged by the body of the male coupler member and moved thereby to open position when the body of the male coupler member is turned to a position disposing the passages of the coupler members in registry, an arcuate strip carried by the body of the female coupler member and extending circumferentially thereof along its marginal edge for a portion of its circumference and having a flange overlapping the arcuate edge of the closure for the female member and holding the said closure flat against the body of the female member and permitting sliding movement of the closure circumferentially of the body, the portion of the body of the male member through which its passage is formed being semicircular and having its arcuate edge provided with a flange partially engaged under the flange of said strip when in open position, and the closure of the female coupler member being partially engaged under the closure of the male member when in open position whereby the said closure members and portions of the bodies of the coupler members have overlapping engagement with each other to releasably hold the coupler members together.

2. A coupling for pipes comprising companion male and female coupler members, each having a cylindrical casing and a body therein formed with a semicircular extension having a straight edge face extending diametrically of the body and an arcuate edge face, the body of each coupler section being formed with a fluid passage having its outer end opening through the extension and surrounded by a gasket, the body of the male coupler member being rotatable in its casing and the body of the female coupler member being stationary, the casing of the male coupler member carrying a semicircular end wall having a diametrically extending edge face abutting the diametrically extending edge face of the extension of the body of said female member, a semicircular plate resting against the extension of the body of said female coupler member and movable along the same from retracted position to extended position when the body of the male member is turned, an arcuate strip anchored to the body of the female member and overlapping the arcuate edge of said plate, and the extension of the body of the male member having its diametrically extending edge engaging the diametrically extending edge of said plate and turning the plate to extended position exposing the fluid passage of the female coupler member when the body of the male coupler member is turned to move its extension to extended position and dispose its fluid passage in registry with the fluid passage of the female member.

3. A coupling for pipes comprising companion male and female coupler members, each having a cylindrical casing and a body therein formed with a semicircular extension having an edge face extending diametrically of the body, the body of each coupler section being formed with a fluid passage having its outer end opening through the extension and surrounded by a gasket, a post carried by the body of the female coupler member centrally thereof and engaging in a socket at the center of the body of said male coupler member to guide rotation of the body of the male coupler member in its casing, the casing of the male coupler member carrying a semicircular end wall having a diametrically extending edge face abutting the diametrically extending edge face of the extension of the body of said female member, a semicircular plate resting against the extension of the body of said female coupler member and movable about said post from retracted position closing the passage of the female coupler member by action of the extension of the body of the male coupler member when said body of the male member is turned to move its passage from under the end wall and into registry with the passage of the female coupler member, said plate and the extension of the male coupler member serving to releasably secure the coupler members together when extended.

ARTHUR A. POMMER.

REFERENCES CITED

The following references are of record in the file of this patent:

UNITED STATES PATENTS

| Number | Name | Date |
| --- | --- | --- |
| 379,684 | Cooke | Mar. 20, 1888 |
| 569,668 | Pinckert et al. | Oct. 20, 1896 |
| 610,035 | Edgington | Aug. 30, 1898 |
| 713,777 | Ledovsky | Nov. 18, 1902 |
| 823,510 | Christensen | June 19, 1906 |
| 1,064,862 | Sharp | June 17, 1913 |
| 2,317,827 | Townhill | Apr. 27, 1943 |
| 2,326,143 | Hufferd | Aug. 10, 1943 |
| 2,357,232 | Snyder et al. | Aug. 29, 1944 |